United States Patent [19]

Cohn

[11] 4,418,455
[45] Dec. 6, 1983

[54] METHOD OF MANUFACTURING A FLUID COOLED BLADE OR VANE

[75] Inventor: Arthur Cohn, Palo Alto, Calif.

[73] Assignee: Electric Power Research Institute, Inc., Palo Alto, Calif.

[21] Appl. No.: 259,997

[22] Filed: May 4, 1981

[51] Int. Cl.³ .............................................. B23P 15/04
[52] U.S. Cl. ........................ 29/156.8 H; 29/156.8 B; 29/157.3 R; 164/112; 164/334; 416/96 R
[58] Field of Search .................. 29/156.8 H, 156.8 B, 29/157.3 R; 164/108, 112, 333, 334; 416/96 R; 165/169

[56] References Cited

U.S. PATENT DOCUMENTS

| 1,799,991 | 4/1931 | Sellick et al. | 164/112 |
| 2,331,554 | 10/1943 | Irgens | 164/108 |
| 2,679,669 | 6/1954 | Kempe | 29/156.8 H |
| 2,707,096 | 4/1955 | Koopmans | 165/169 |
| 4,137,619 | 2/1979 | Beltran et al. | 29/156.8 H |
| 4,259,037 | 3/1981 | Anderson | 416/96 R |
| 4,283,822 | 8/1981 | Muth et al. | 29/156.8 B |

FOREIGN PATENT DOCUMENTS

| 520066 | 12/1955 | Canada | 164/333 |
| 698567 | 11/1964 | Canada | 164/108 |
| 2051964 | 1/1981 | United Kingdom | 416/96 R |

*Primary Examiner*—Daniel C. Crane
*Attorney, Agent, or Firm*—Flehr, Hohbach, Test, Albritton & Herbert

[57] ABSTRACT

A fluid cooled blade or vane for use in a gas turbine or like apparatus is disclosed herein. The blade or vane includes an elongated open ended skin of predetermined cross-sectional configuration, a number of spaced cooling tubes located within and extending in the elongated direction of the open ended skin, a reinforcement spar disposed within the skin along with tubes, and solid material, preferably copper, filling the elongated skin around the tubes and spar. A specific method of making the blade or vane just described is also disclosed and includes initially providing the elongated skin as a preform. The cooling tubes and spar are disposed within the preform in their intended positions. Thereafter, the filling material while being maintained in a molten liquid state is caused to flow into the remaining space within the preform around the tubes and reinforcement spar. At the same time, this molten material is prevented from entering the tubes. Thereafter, the molten material solidifies within the preform so as to hold the cooling tubes and reinforcement spar in place.

14 Claims, 3 Drawing Figures

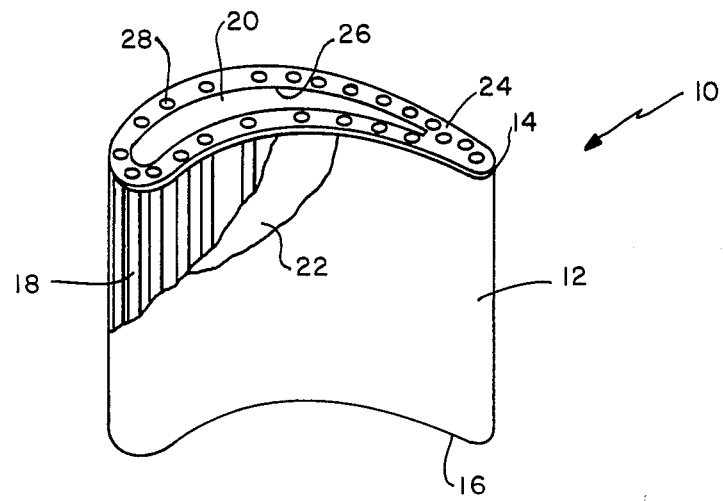
FIG.—1
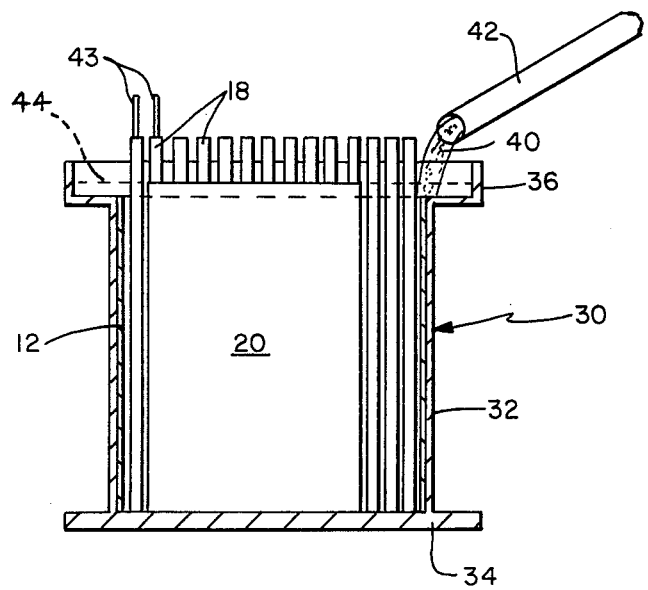
FIG.—3

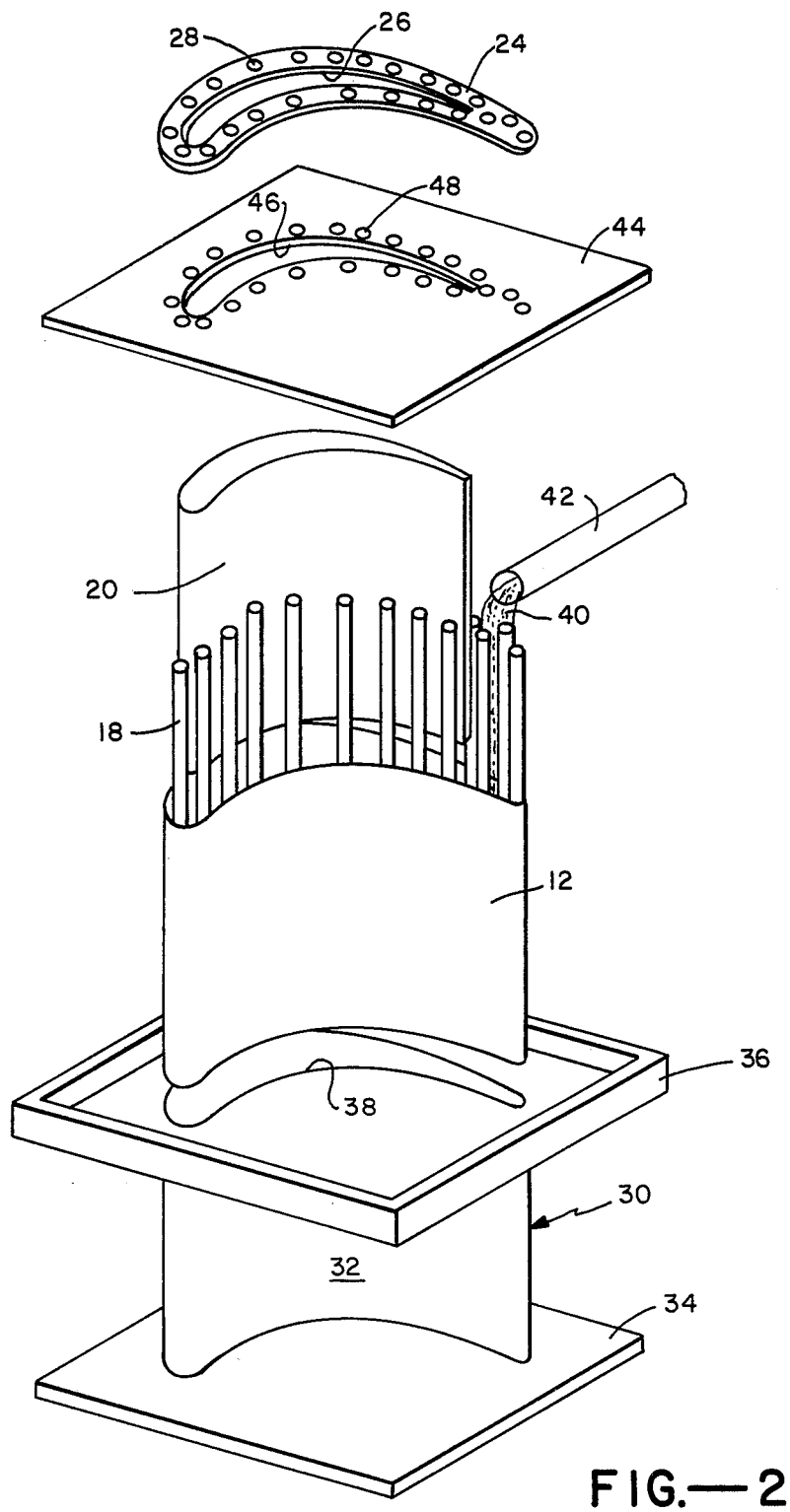
FIG.—2

METHOD OF MANUFACTURING A FLUID COOLED BLADE OR VANE

The present invention relates generally to blades or vanes for use in water cooled gas turbines or like apparatus and more particularly to a specific method of making the blades or vanes.

The particular type of blade or vane to which the present invention is directed is one which includes an outermost skin constructed of nickle or like material, a number of cooling tubes and a reinforceing spar disposed within the outer skin, and copper or like material filling the remaining space within the outermost skin around and between the cooling tubes and reinforcement spar. One previously suggested way of making this blade or vane calls for placing copper powder over a steel spar and thereafter laying the cooling tubes into the powder. This combination is then hot isostatic pressed together. Therafter, a nickle skin is formed over the pressed combination and the latter along with the skin is again pressed in the same way.

Because the process just described tends to be complicated and not entirely reliable, it is a primary object of the present invention to provide a method of making a blade or vane of the same general type in a way which is uncomplicated and reliable.

Another, more specific object of the present invention is to minimize the possibility of crushing the cooling tubes forming part of the above described blade or vane during formation of the latter.

Still another specific object of the present invention is to insure that the cooling tubes and reinforcement spar are maintained in their proper positions during formation of the blade or vane.

Yet another specific object of the present invention is to insure that the outermost configuration of the blade or vane is formed in accordance with its intended design.

As will be described in more detail hereinafter, the blade or vane disclosed herein is made in accordance with the present invention by first providing its outermost skin as a preform having a predetermined cross-sectional configuration including opened top and bottom ends. This insures that the outermost configuration of the overall blade or vane will correspond as closely as possible to its intended design. Cooling tubes are disposed within the preform in their intended positions along with a reinforcement spar or the like if the latter is used. Thereafter, the remaining space within the preform is filled with molten material, for example the copper referred to above. At the same time, this molten material is prevented from entering the tubes, preferably by filling the latter with particulate material, rods or the like which also serve to prevent the tubes from being crushed. Finally, the molten material is allowed to solidify.

The method just recited briefly will be described in more detail hereinafter in conjunction with the drawings wherein:

FIG. 1 is a partially broken away perspective view of the blade or vane formed in accordance with the present invention;

FIG. 2 is an exploded perpsective view illustrating the way in which the blade or vane of FIG. 1 is made; and FIG. 3 is a vertical sectional view illustrating an intermediate step in the formation of the blade or vane illustrated in FIG. 1.

Turning now to the drawings, wherein like components are designated by like reference numerals throughout the three figures, attention is first directed to FIG. 1. There, a water cooled blade or vane member especially suitable for use as part of a gas turbine or like apparatus is illustrated and generally designated by the reference numeral 10. This member which may be either a dynamic component of the overall apparatus (e.g. a blade) or a static component (e.g. a vane) includes an outermost, elongated skin 12 having a top end 14 and a bottom end 16. The skin is constructed of any suitable corrosive and errosive resistant alloy, preferably nickle, and displays a predetermined aerodynamic-like cross-sectional configuration which is best illustrated in FIG. 1. As will be discussed hereinafter in conjunction with FIGS. 2 and 3, skin 12 is initially provided as a preform with its top and bottom ends open. Any suitable and readily available molding or possibly extruding technique could be utilized to make this preform in the desired, predesigned shape. In this way, the outermost configuration of the overall blade or vane member which depends upon the configuration of skin 12 can be reliably provided.

In addition to outermost skin 12, member 10 includes a plurality of spaced apart, open ended cooling tubes 18 located within and extending in the elongated direction of the skin between ends 14 and 16. The tubes may be constructed of any suitable material such as copper. A reinforcement spar 20 having the same general cross-sectional configuration as skin 12 but smaller in scale is also disposed within skin 12 and, like tubes 18, extends the length of the outermost skin between the top and bottom ends of the latter. As seen best in FIG. 1, spar 20 is located centrally within the outermost skin with the tubes located around the latter. In this regard, other suitable reinforcement means may be provided in addition to or in lieu of spar 20 and the latter, if used, may be of any suitable reinforcement material such as steel. Moreover, its shape may be dictated by the number and positioning of the cooling tubes.

In addition to the various components thus far described, overall blade or vane member 10 includes solid material, preferably copper, filling the remaining space within skin 12 around and between tubes 18 and spar 20. This material is generally indicated at 22 in FIG. 1 and extends from the top end of the skin to its bottom end. For reasons associated with the way in which member 10 is made, as will be discussed below, an end cap 24 is fixedly attached by welding or other suitable means to the top end of skin 12. The end cap includes a central opening 26 corresponding to the cross-sectional configuration of spar 20 and an array of openings 28 disposed around central opening 26 in a pattern corresponding to tubes 18. As will be seen hereinafter, each of the tubes and reinforcement spar 20 has a relatively short top segment (preferably equal to the thickness of end cap 24) which extends up beyond the top end 14 of skin 12 and the top end of material 22. In this way, end cap 24 can be readily positioned against the top end of skin 12 such that the top end segments of the reinforcement spar and cooling tubes extend into their respective openings within the end cap.

Having described water cooled blade or vane member 10, attention is now directed to the way in which this member is made in accordance with the present invention. To this end reference is made to FIGS. 2 and 3 which illustrate an upstanding mold 30 having a main body 32, a lowermost base 34 and a top spill-over bed 36. As best seen in FIG. 2, main body 32 includes a vertically extending cavity 38 which opens into bed 36 and which corresponds in cross-sectional configuration to outermost skin 12 of member 10. However, cavity 38 is slightly larger than the skin so as to just receive the latter in its preformed state, as will be seen below.

In assembling together all of the components making up blade or vane member 10, skin 12 is initially provided as a preform, as stated above. This preform which is best illustrated in FIG. 2 is disposed within cavity 38 such that its bottom open end 16 rests against and is closed by the bottom end of the cavity, as best seen in FIG. 3. Thereafter, the cooling tubes 18 and reinforcement spar 20 are located within the preform, in their intended position. In this regard, each of the tubes is initially provided substantially longer than the preform and hence includes a top end section which extends upwardly beyond the preform and bed 36 of mold 30. The reinforcement spar is also preferably initially provided longer than the preform but only by a small amount so that only a small top end section projects upwardly beyond the preform.

After the tubes 18 and reinforcement spar 20 have been positioned in the manner just recited, the remaining space within preform 12 is filled with the previously mentioned copper or like material 22 which is maintained in its molten liquid state, as generally indicated at 40 in FIG. 2. Any suitable means generally indicated at 42 may be provided for introducing the molten material into the preform. The molten material is then caused to solidify, for example by allowing it to cool to room temperature. In this regard, before the molten copper is provided, the cooling tubes are preferably filled with particulate material, e.g. sand, or rods 43 (see FIG. 3). This prevents the molten copper or like material from entering the cooling tubes and, at the same time prevents the tubes from being crushed by the solidifying copper.

In order to insure that tubes 18 and spar 20 remain in their appropriate positions within skin 12 as molten material 22 solidifies, suitable means may be provided for retaining the tubes and reinforcement spar in place during this period. One such means to accomplish this is the alignment plate 44 illustrated in FIG. 2. This alignment plate includes a somewhat central opening 46 corresponding in configuration to the cross-section of spar 20 and slightly larger so as to receive the latter. In a similar fashion, a plurality of through holes 48 are provided around central opening 46 in an array corresponding to the positional arrangement of tubes 18 and slightly larger than the tubes for receiving the latter. After the preformed skin 12 has been filled with molten material 22 and while the latter is still in a molten liquid state, the alignment plate is disposed within bed 36 of mold 30 over the top end of the preform such that the upwardly extending top end sections of tubes 18 extend through corresponding through holes 48 and such that the upwardly projecting top end section of reinforcement spar 20 sits within central opening 46. This keeps both the tubes and reinforcement spar in the desired position until the molten material can solidify. Thereafter, the excess segments of tubes 18, that is, those segments extending beyond the alignment plate may be severed from the rest of the tubes and the alignment plate can be replaced with previously described end cap 24. The end cap includes the previously described openings 26 and 28 which correspond to the central opening 46 and through holes 48 in alignment plate 44 and can therefore be readily fitted into the position illustrated in FIG. 1. The end cap can be welded to preform 12 or otherwise fixed in place.

What is claimed is:

1. A method of making a fluid cooled blade or vane for use in a gas turbine or like apparatus, said blade or vane having an elongated spaced, open ended skin of predetermined cross-sectional configuration including open top and bottom ends, a plurality of spaced, open ended cooling tubes located within and extending in the elongated direction of said skin between the open ends of the latter and solid material filling said elongated skin around said tubes, said method comprising the steps of: initially providing said elongated skin as a preform; temporarily closing the bottom end of said preform; disposing said cooling tubes in their intended positions within said preform at lengths greater than the elongated length of the latter such that a top section of each tube extends beyond the opened top end of said preform whereby to prevent molten material from entering said tubes through their open top ends as said preform is filled with said material; initially providing said solid filling material in a molten liquid state; filling said preform around said tubes with said molten material while, at the same time, preventing said molten material from entering said tubes; causing said molten material to solidify; severing at least most of each top end section of said tubes after said preform has been filled with said material; providing an alignment plate having an array of through holes corresponding to the positional arrangement of the said tubes; placing the end sections of said tubes into aligned ones of said through holes before said preform is filled with said material whereby to hold said tubes in place; and removing said plate after said preform has been filled with said material.

2. A method according to claim 1 wherein at least a bottom end section of said preform is initially placed within a cooperating support cavity of a mold so as to close the bottom end of said preform.

3. A method according to claim 1 wherein said molten material is prevented from entering said tubes as said preform is filled with said material by closing the ends of said tubes during the filling period.

4. A method according to claim 3 wherein said tube ends are closed by filling the space within each tube with particulate material, the latter also serving to prevent said tubes from being crushed by said molten material as the latter enters the preform or as it solidifies.

5. A method according to claim 3 wherein said tube ends are closed by filling the space within each tube with a rod, the latter also serving to prevent said tubes from being crushed by said molten material as the latter enters the preform or as it solidifies.

6. A method according to claim 1 wherein each of the top end sections of said tubes is severed such that a substantially smaller top segment thereof remains, said method including the steps of providing an end cap having an array of openings arranged in accordance with the same pattern as said tubes and attaching said cap onto the top end of said preform such that said openings receive respective ones of said small tube end segments.

7. A method according to claim 1 including the step of placing a spar in said preform along with said tubes to reinforce the entire blade or vane.

8. A method according to claim 1 wherein said preform is constructed of nickel and said molten material is copper.

9. A method of making a fluid cooled blade or vane for use in a gas turbine or like apparatus, said blade or vane having an elongated nickel skin displaying predetermined aerodynamic cross-sectional configuration including an opened top end and opposite opened bottom end, a plurality of spaced, open ended cooling tubes located within and extending in the elongated direction of said skin between the open ends of the latter, a reinforcement spar disposed within and extending the length of said skin between the opened ends of the latter and solid copper material filling said elongated skin around said tubes and spar, said method comprising the steps of: initially providing said elongated skin as a preform; placing said preform within a cooperating support cavity of a mold such that the bottom open end of said preform rests against and is closed by the bottom end of said cavity while the top open end of said preform is readily accessible; thereafter placing said cooling tubes in their intended positions within said preform, said tubes being initially provided in lengths greater than the elongated length of said preform such that a top end section of each tube extends beyond the open end of such preform; filling each of said tubes with a solid material whereby to improve the crush strength of said tubes; placing said spar within said preform; thereafter filling said preform around said tubes and spar with said copper material while the latter is in a molten liquid state; causing said molten copper material within said preform to solidify; removing said solid material from said tubes; thereafter severing at least most of each top end section of each of said tubes; providing an alignment plate having an array of through holes displaying the same configuration as said tubes when the latter are in their intended positions; placing the end sections of said tubes into aligned ones of said through holes before said preform is filled with said copper material whereby to hold said tubes in place; and thereafter removing said plate after the preform has been filled with said material and the latter soldified.

10. A method according to claim 9 wherein each of said tubes is filled with particulate material.

11. A method according to claim 9 wherein each of said tubes is filled with a rod.

12. A method according to claim 9 wherein each of the top end sections of each of said tubes is severed such that a substantially smaller top segment thereof remains, said method including the steps of providing an end cap having an array of openings arranged in accordance with the same pattern as said tubes and attaching said end cap onto the top end of said preform such that said openings receive respective ones of said small end segments.

13. A method of making a fluid cooled blade or vane for use in a gas turbine or like apparatus, said blade or vane having an elongated spaced, open ended skin of predetermined cross-sectional configuration including open top and bottom ends, a plurality of spaced, open ended cooling tubes located within and extending in the elongated direction of said skin between the open ends of the latter and solid material filling said elongated skin around said tubes, said method comprising the steps of: initially providing said elongated skin as a preform; temporarily closing the bottom end of said preform; disposing said cooling tubes in their intended positions within said preform at lengths greater than the elongated length of the latter such that a top section of each tube extends beyond the opened top end of said preform whereby to prevent molten material from entering said tubes through their open top ends as said preform is filled with said material; initially providing said solid filling material in a molten liquid state; filling said preform around said tubes with said molten material while, at the same time, preventing said molten material from entering said tubes; and causing said molten material to solidify; severing most but not all of each top end section of said tubes after said preform has been filled with said material such that a substantially smaller top segment thereof remains; providing an end cap having an array of openings arranged in accordance with the same pattern as said tubes; and attaching said cap onto the top end of said preform such that said openings receive respective ones of said small tube end segments.

14. A method of making a fluid cooled blade or vane for use in a gas turbine or like apparatus, said blade or vane having an elongated nickel skin displaying a predetermined aerodynamic cross-sectional configuration including an opened top end and opposite opened bottom end, a plurality of spaced, open ended cooling tubes located within and extending in the elongated direction of said skin between the open ends of the latter, a reinforcement spar disposed within and extending the length of said skin between the opened ends of the latter and solid copper material filling said elongated skin around said tubes and spar, said method comprising the steps of: initially providing said elongated skin as a preform; placing said preform within a cooperating support cavity of a mold such that the bottom open end of said preform rests against and is closed by the bottom end of said cavity while the top open end of said preform is readily accessible; thereafter placing said cooling tubes in their intended positions within said preform, said tubes being initially provided in lengths greater than the elongated length of said preform such that a top end section of each tube extends beyond the open end of such preform; filling each of said tubes with a solid material whereby to improve the crush strength of said tubes; placing said spar within said preform; thereafter filling said preform around said tubes and spar with said copper material while the latter is in a molten liquid state; causing said molten copper material within said preform to solify; removing said solid material from said tubes; and thereafter severing at most but not all of each top end section of each of said tubes such that a substantially smaller top segment thereof remains; providing an end cap having an array of openings arranged in accordance with the same pattern as said tubes; and attaching said end cap onto the top end of said preform such that said openings receive respective ones of said small end segments.

* * * * *